US012794262B2

(12) United States Patent
Wakazono

(10) Patent No.: US 12,794,262 B2
(45) Date of Patent: Nov. 10, 2026

(54) IN-VEHICLE CONTROL DEVICE

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventor: Keisuke Wakazono, Yokkaichi (JP)

(73) Assignees: AutoNetworks Technologies, Ltd., Volknichi (JP); Stomo Wiring Systems, Lti, Mie (JP); Samitomen Electric Industries, Ltd., Oraka (JP)

( * ) Notice: Subject to any disclaimer, the term of this patent is extended or adjusted under 35 U.S.C. 154(b) by 0 days.

(21) Appl. No.: 19/150,678

(22) PCT Filed: Jan. 25, 2023

(86) PCT No.: PCT/JP2023/002203
§ 371 (c)(1),
(2) Date: Jul. 24, 2025

(87) PCT Pub. No.: WO2024/157374
PCT Pub. Date: Aug. 2, 2024

(65) Prior Publication Data

US 2026/0229915 A1 Aug. 6, 2026

(51) Int. Cl.

| | |
|---|---|
| ***H02J 9/06*** | (2006.01) |
| ***B60R 16/023*** | (2006.01) |
| ***B60R 16/033*** | (2006.01) |

(52) U.S. Cl.
CPC .......... *H02J 9/068* (2020.01); *B60R 16/0231* (2013.01); *B60R 16/033* (2013.01)

(58) Field of Classification Search
CPC ..... H02J 9/068; B60R 16/0231; B60R 16/033
(Continued)

(56) References Cited

U.S. PATENT DOCUMENTS

| | | | | |
|---|---|---|---|---|
| 10,518,725 | B2 * | 12/2019 | Masui | B60L 3/0046 |
| 11,201,498 | B2 * | 12/2021 | Wataru | B60L 1/00 |

(Continued)

FOREIGN PATENT DOCUMENTS

| | | |
|---|---|---|
| JP | 2008-289270 A | 11/2008 |
| JP | 2017-041967 A | 2/2017 |
| JP | 2019-004560 A | 1/2019 |

OTHER PUBLICATIONS

International Search Report, Application No. PCT/JP2023/002203, mailed Apr. 4, 2023. ISA/Japan Patent Office.

*Primary Examiner* — Hal Kaplan
(74) *Attorney, Agent, or Firm* — Brooks Kushman P.C

(57) ABSTRACT

A voltage conversion unit performs a first conversion operation of converting a voltage applied to a third power path and applying an output voltage to a fourth power path, and a second conversion operation of converting a voltage applied to the fourth power path and applying an output voltage to the third power path. A control unit controls the voltage conversion unit. A first circuit element part is capable of allowing a current to flow from a first power path to the third power path and interrupting a current flow from the third power path to the first power path. A second circuit element part is capable of allowing a current to flow from an intermediate conductive path between a first power storage unit and a second power storage unit to a second power path and interrupting a current flow from the second power path to the intermediate conductive path.

16 Claims, 7 Drawing Sheets

(58) Field of Classification Search
USPC .................................................. 307/9.1, 10.1
See application file for complete search history.

(56) References Cited

U.S. PATENT DOCUMENTS

| | | | | |
|---|---|---|---|---|
| 11,987,191 | B2 * | 5/2024 | Mitani | B60R 16/033 |
| 2018/0334118 | A1 | 11/2018 | Masui et al. | |
| 2020/0343763 | A1 | 10/2020 | Wataru | |
| 2023/0192017 | A1 | 6/2023 | Mitani et al. | |

* cited by examiner

IN-VEHICLE CONTROL DEVICE

CROSS-REFERENCE TO RELATED APPLICATIONS

This application is the U.S. national stage of PCT/JP2023/002203 filed on Jan. 25, 2023, the contents of which is incorporated herein.

TECHNICAL FIELD

The present disclosure relates to an in-vehicle control device.

BACKGROUND

JP 2020-182318A discloses a power supply system. The power supply system of JP 2020-182318A includes a main battery and a secondary battery, and is operated to switch the power supply source to a load from the main battery to the secondary battery when power supply from the main battery is interrupted. In the power supply system of JP 2020-182318A, a switch between the secondary battery and the load includes a body diode, and when power from the main battery is interrupted, power is supplied to the load via the body diode even if this switch is off, so that power supply is not interrupted.

The power supply system of JP 2020-182318A has a risk in that if the output voltage of the secondary battery drops, no proper voltage can be supplied to the load. In order to solve this concern, it is desirable to employ a discharge circuit that can supply a proper voltage to the load based on power from the secondary battery. However, simply employing such a discharge circuit would complicate the device configuration. On the other hand, in a system that can supply power to a load from a secondary battery, if the secondary battery is discharged for some reason, the secondary battery needs to be recharged in case of failure, and it is thus desirable to employ a charging circuit that can supply a proper voltage to the secondary battery. However, simply employing such a charging circuit would cause further complications.

The present disclosure relates to an in-vehicle control device capable of backup operation for supplying power based on a power storage unit, and an object thereof is to provide a technology that can adjust a charging voltage when charging the power storage unit and a discharging voltage when discharging the power storage unit with a simpler configuration, and can discharge the power storage unit via a path different from the path in which the voltages are adjusted.

SUMMARY

An in-vehicle control device according to the present disclosure relates to an in-vehicle control device for use in an in-vehicle system that is provided with: a power source unit for supplying power; a power storage unit that is different from the power source unit; a first power path to which power from the power source unit is supplied; and a second power path serving as a path for supplying power supplied from the first power path to a load, the in-vehicle control device being configured to control power supply from the power storage unit and including: a voltage conversion unit that is provided between the second power path and the power storage unit, and is configured to perform a first conversion operation of converting a voltage applied to a third power path provided on a second power path side and applying an output voltage to a fourth power path provided on a power storage unit side, and a second conversion operation of converting a voltage applied to the fourth power path and applying an output voltage to the third power path; a control unit configured to control the voltage conversion unit; and a first circuit element part capable of allowing a current to flow from the first power path to the third power path and interrupting a current flow from the third power path to the first power path, wherein the power storage unit includes a first power storage unit, and a second power storage unit located on a lower potential side than the first power storage unit and connected in series with the first power storage unit, and the in-vehicle control device further includes a second circuit element part capable of allowing a current to flow from an intermediate conductive path between the first power storage unit and the second power storage unit to the second power path, and interrupting a current flow from the second power path to the intermediate conductive path.

Advantageous Effects

The technology according to the present disclosure can adjust a charging voltage when charging a power storage unit and a discharging voltage when discharging the power storage unit with a simpler configuration, and can discharge the power storage unit via a path different from the path in which the voltages are adjusted.

DETAILED DESCRIPTION OF PREFERRED EMBODIMENTS

Figure 1:
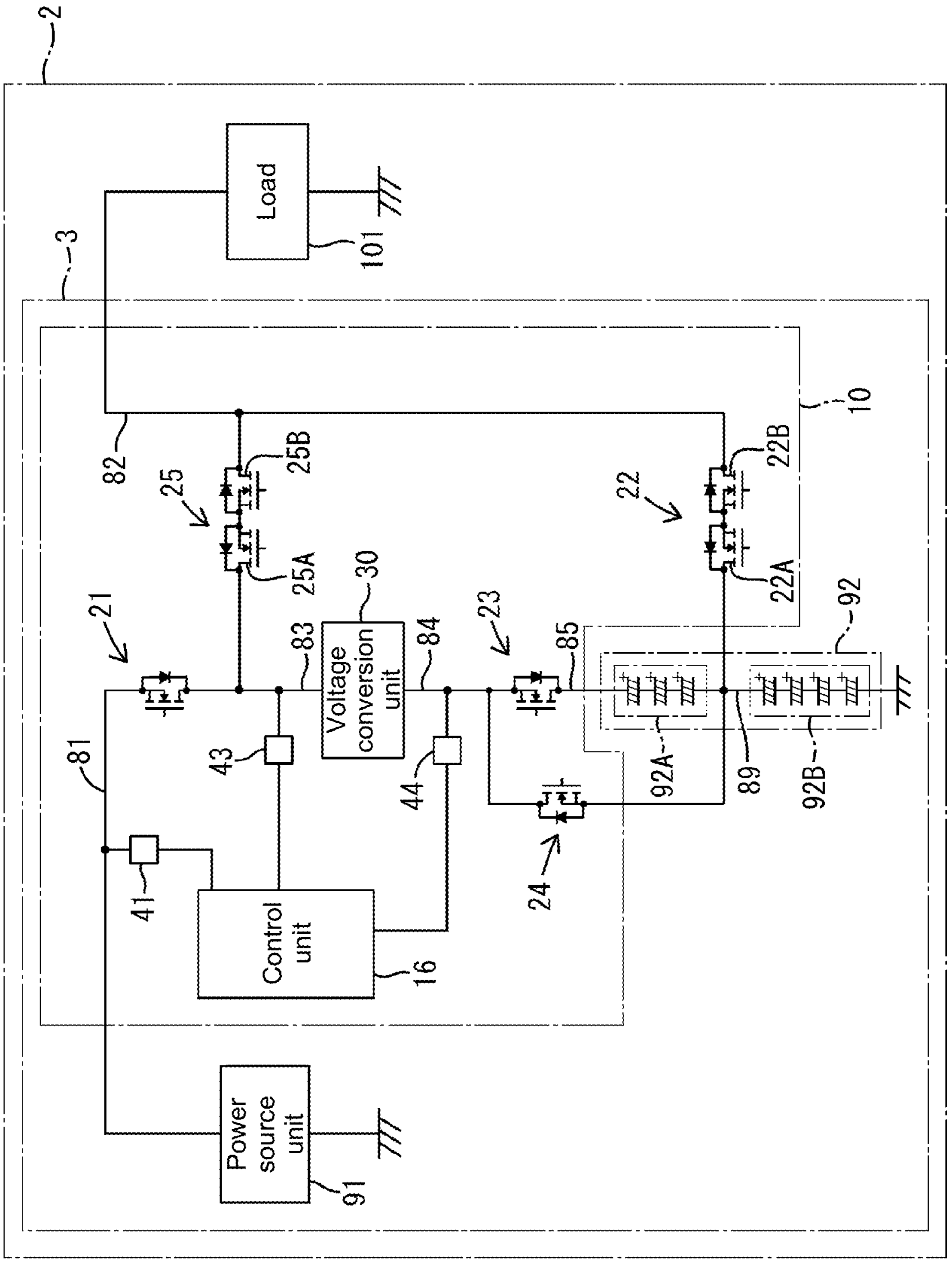
FIG. 1 is a circuit diagram schematically showing an example of an in-vehicle system including an in-vehicle control device of a first embodiment.

Hereinafter, embodiments according to the present disclosure will be listed and described.

In a first aspect, an in-vehicle control device for use in an in-vehicle system that is provided with: a power source unit for supplying power; a power storage unit that is different from the power source unit; a first power path to which power from the power source unit is supplied; and a second power path serving as a path for supplying power supplied from the first power path to a load is configured to control power supply from the power storage unit and includes: a voltage conversion unit that is provided between the second power path and the power storage unit, and is configured to perform a first conversion operation of converting a voltage applied to a third power path provided on a second power path side and applying an output voltage to a fourth power path provided on a power storage unit side, and a second conversion operation of converting a voltage applied to the fourth power path and applying an output voltage to the third power path; a control unit configured to control the voltage conversion unit; and a first circuit element part capable of allowing a current to flow from the first power path to the third power path and interrupting a current flow from the third power path to the first power path, wherein the power storage unit includes a first power storage unit, and a second power storage unit located on a lower potential side than the first power storage unit and connected in series with the first power storage unit, and the in-vehicle control device further includes a second circuit element part capable of allowing a current to flow from an intermediate conductive path between the first power storage unit and the second power storage unit to the second power path, and interrupting a current flow from the second power path to the intermediate conductive path.

By causing the voltage conversion unit to perform the first conversion operation with the first circuit element part allowing a current to flow from the first power path to the third power path, the in-vehicle control device can charge the power storage unit while applying a desired voltage to the fourth power path. Also, by causing the voltage conversion unit to perform the second conversion operation, the in-vehicle control device can supply power to the second power path while applying a desired voltage to the third power path. In other words, the in-vehicle control device can adjust a charging voltage when charging the power storage unit and a discharging voltage when discharging the power storage unit with a simpler configuration, and in some cases, the first circuit element part can interrupt a current flow from the third power path to the first power path. Furthermore, since the second circuit element part is provided and can allow a current to flow from the intermediate conductive path between the first power storage unit and the second power storage unit to the second power path, it is possible to discharge the second power storage unit through a path other than the path in which the voltages are adjusted by the voltage conversion unit. Furthermore, since the second circuit element part can interrupt a current flow from the second power path to the intermediate conductive path, it is possible to interrupt a current flow into the second power storage unit from the second power path through the second circuit element part in some cases. Furthermore, according to the configuration in which the second power storage unit is discharged via the second circuit element part, the output voltage is reduced compared to the configuration in which the power storage unit is directly discharged. Therefore, it is easier to prevent the voltage to be input to the load from exceeding the rated voltage of the load.

In a second aspect, the in-vehicle control device according to the first aspect further includes: a third circuit element part provided between the fourth power path and a fifth power path to which an output voltage of the power storage unit is applied; and a fourth circuit element part provided in parallel with an arrangement in which the third circuit element part and the first power storage unit are connected in series, wherein the third circuit element part is configured to interrupt a current flow from the fifth power path to the fourth power path through the third circuit element part when the third circuit element part is off, and to allow a current to flow from the fifth power path to the fourth power path through the third circuit element part when the third circuit element part is on, the fourth circuit element part is configured to interrupt a current flow from the fourth power path to the intermediate conductive path through the fourth circuit element part when the fourth circuit element part is off, and to allow a current to flow from the fourth power path to the intermediate conductive path through the fourth circuit element part when the fourth circuit element part is on, when the control unit causes the voltage conversion unit to perform the first conversion operation by turning the third circuit element part on and the fourth circuit element part off, power is supplied from the voltage conversion unit to the power storage unit, and when the control unit causes the voltage conversion unit to perform the first conversion operation by turning the third circuit element part off and the fourth circuit element part on, power is supplied from the voltage conversion unit to the second power storage unit via the fourth circuit element part.

The in-vehicle control device can selectively supply power from the voltage conversion unit to the power storage unit, and to the second power storage unit with the first power storage unit bypassed.

In a third aspect, in the in-vehicle control device according to the second aspect, the control unit causes the voltage conversion unit to perform the first conversion operation by turning the third circuit element part off and the fourth circuit element part on, while allowing a current to flow across the first circuit element part from the first power path to the third power path and allowing a current to flow across the second circuit element part from the intermediate conductive path to the second power path.

Since the power is supplied to the intermediate conductive path via the first circuit element part and the fourth circuit element part even if a current flows from the intermediate conductive path to the second power path via the second circuit element part, the in-vehicle control device can suppress a voltage drop in the second power storage unit. This can also suppress a voltage rise in the first power storage unit caused by a voltage drop in the second power storage unit, which in turn can suppress, for example, deteriorations in the first power storage unit.

In a fourth aspect, in the in-vehicle control device according to the third aspect, the control unit increases power to be supplied from the voltage conversion unit to the intermediate conductive path via the fourth circuit element part to a value that is greater than power to be supplied from the intermediate conductive path to the second power path via the second circuit element part.

The in-vehicle control device can supply larger power to the intermediate conductive path even if a current flows from the intermediate conductive path to the second power path via the second circuit element part. Therefore, the in-vehicle control device can supply power to the second conductive path while ensuring a charging current to the second power storage unit more reliably.

In a fifth aspect, in the in-vehicle control device according to any one of the second to the fourth aspects, when a voltage of the power storage unit is less than a predetermined lower limit voltage, the control unit causes the voltage conversion unit to start the first conversion operation so that a voltage to be applied to the fourth power path reaches a first target value, while turning the third circuit element part on and the fourth circuit element part off, and when the voltage of the power storage unit is a charge completion voltage, which is higher than or equal to the lower limit voltage, the control unit causes the voltage conversion unit to perform the first conversion operation so that the voltage to be applied to the fourth power path reaches a second target value, which is lower than the first target value, while turning the third circuit element part off and the fourth circuit element part on.

The in-vehicle control device can charge the power storage unit with power from the voltage conversion unit when the voltage of the power storage unit is less than the lower limit voltage, and can supply power to the second power storage unit at a lower output voltage when the power storage unit reaches the charge completion voltage.

In a sixth aspect, in the in-vehicle control device according to the fifth aspect, if a predetermined failure determination condition is not satisfied when a voltage of the first power path is less than or equal to a first threshold, the control unit causes the voltage conversion unit to perform the first conversion operation by turning the third circuit element part off and the fourth circuit element part on, while allowing a current to flow across the first circuit element part from the first power path to the third power path and allowing a current to flow across the second circuit element part from the intermediate conductive path to the second power path, and if the failure determination condition is satisfied when the voltage of the first power path is less than or equal to the first threshold, the control unit causes the voltage conversion unit to perform the second conversion operation by turning the third circuit element part on and the fourth circuit element part off, while interrupting a current flow across the first circuit element part from the third power path to the first power path and interrupting a current flow across the second circuit element part from the second power path to the intermediate conductive path.

If the failure determination condition is not satisfied even when the voltage of the first power path has dropped to a value less than or equal to the first threshold, the in-vehicle control device can subject power from the power source unit to voltage conversion by the voltage conversion unit to supply the converted voltage toward the intermediate conductive path, while supplying power from the second power storage unit to the second power path via the second circuit element part. On the other hand, if the failure determination condition is satisfied, the in-vehicle control device can subject the power from the power storage unit to voltage conversion by the voltage conversion unit to supply the converted voltage to the second power path, while interrupting a reverse flow toward the first power path.

In a seventh aspect, in the in-vehicle control device according to [6], the second circuit element part is configured to interrupt a current flow between the intermediate conductive path and the second power path in both directions through the second circuit element part when the second circuit element part is off, and allow a current to flow from the intermediate conductive path to the second power path through the second circuit element part when the second circuit element part is on, the control unit controls on/off of at least the second circuit element part, and if switching is made from a state where the failure determination condition is not satisfied to a state where the failure determination condition is satisfied when the voltage of the first power path is less than or equal to the first threshold, the control unit keeps the second circuit element part on before and after the switching, the control unit causes, after the switching, the voltage conversion unit to perform the second conversion operation by turning the third circuit element part on and the fourth circuit element part off, while interrupting a current flow across the first circuit element part from the third power path to the first power path, and if the voltage conversion unit satisfies a predetermined operation condition after the switching, the control unit switches the second circuit element part off.

If the voltage of the first power path is less than or equal to the first threshold and the state is changed to a state where the failure determination condition is not satisfied, the in-vehicle control device can turn on the second circuit element part to quickly supply power to the second power path from the second power storage unit. If the state is switched from the state where the failure determination condition is not satisfied to a state where the failure determination condition is satisfied when the voltage of the first power path is less than or equal to the first threshold, the in-vehicle control device can supply, after the switching, power whose voltage was adjusted by the second conversion operation to the second power path via the third power path, while preventing a reverse flow toward the first power path. Moreover, since this in-vehicle control device can keep the second circuit element part in the on state before and after the switching, it is possible to maintain power supply from the second power storage unit to the second power path via the second circuit element part even if the output of the voltage conversion unit rises slowly after the switching. Furthermore, if the voltage conversion unit satisfies a predetermined operation condition after the switching, the in-vehicle control device can switch off the second circuit element part to narrow down the discharge path to the third power path, from among the path of the second circuit element part and the third power path.

In an eighth aspect, in the in-vehicle control device according to the sixth or the seventh aspect, the failure determination condition includes a condition that a current flows from the third power path to the first power path via the first circuit element part, if no current flows from the third power path to the first power path via the first circuit element part when the voltage of the first power path is less than or equal to the first threshold, the control unit causes the voltage conversion unit to perform the first conversion operation by turning the third circuit element part off and the fourth circuit element part on, while allowing a current to flow across the first circuit element part from the first power path to the third power path, and the control unit allows a current to flow across the second circuit element part from the intermediate conductive path to the second power path, and if a current flows from the third power path to the first power path via the first circuit element part when the voltage of the first power path is less than or equal to the first threshold, the control unit causes the voltage conversion unit to perform the second conversion operation by turning the third circuit element part on and the fourth circuit element part off, while interrupting a current flow across the first circuit element part from the third power path to the first power path.

If the voltage of the first power path is less than or equal to the first threshold, the in-vehicle control device can confirm that no current flows to the first power path via the first circuit element part, i.e., it is not highly likely that a ground fault has occurred in the first power path, and then cause the voltage conversion unit to perform the first conversion operation to charge the second power storage unit. Then, this in-vehicle control device can perform discharge of power via the second circuit element part in parallel with supply of power toward the second power storage unit due to the first conversion operation. On the other hand, if a current flows to the first power path via the first circuit element part when the voltage of the first power path is less than or equal to the first threshold, i.e., if it is highly likely that a ground fault has occurred in the first power path, the in-vehicle control device can interrupt a current flow across the first circuit element part to the first power path and can suppress the ground fault from affecting the third power path. Then, by causing the voltage conversion unit to perform the second conversion operation, it is possible to supply power whose voltage was adjusted by the voltage conversion unit to the second power path while suppressing the effect of the ground fault.

In a ninth aspect, in the in-vehicle control device according to any one of the sixth to the eighth aspects, the failure determination condition includes a condition that the voltage of the first power path is less than or equal to a second threshold, which is lower than the first threshold, if the voltage of the first power path is less than or equal to the first threshold and exceeds the second threshold, the control unit causes the voltage conversion unit to perform the first conversion operation by turning the third circuit element part off and the fourth circuit element part on, while allowing a current to flow across the first circuit element part from the first power path to the third circuit element part, and the control unit allows a current to flow across the second circuit element part from the intermediate conductive path to the second power path, and if the voltage of the first power path is less than or equal to the second threshold, the control unit causes the voltage conversion unit to perform the second conversion operation by turning the third circuit element part on and the fourth circuit element part off, while interrupting a current flow across the first circuit element part from the third power path to the first power path.

If the voltage of the first power path is less than or equal to the first threshold, the in-vehicle control device can confirm that the voltage exceeds the second threshold, i.e., the voltage of the first power path is not too low, and then cause the voltage conversion unit to perform the first conversion operation to charge the second power storage unit. Then, this in-vehicle control device can perform discharge of power via the second circuit element part in parallel with supply of power toward the second power storage unit due to the first conversion operation. On the other hand, if the voltage of the first power path is less than or equal to the second threshold, i.e., if the voltage of the first power path is too low, it is possible to interrupt a current flow across the first circuit element part to the first power path, and thus even if a ground fault occurs in the first power path, it is possible to suppress the ground fault from affecting the third power path. Then, by causing the voltage conversion unit to perform the second conversion operation, it is possible to supply power whose voltage was adjusted by the voltage conversion unit to the second power path while suppressing the effect of the voltage drop in the first power path.

In a tenth aspect, in the in-vehicle control device according to any one of the sixth to the ninth aspects, the failure determination condition includes a condition that a predetermined failure signal is given to the in-vehicle control device from an external device other than the in-vehicle control device, if the voltage of the first power path is less than or equal to the first threshold and the failure signal is not given from the external device, the control unit causes the voltage conversion unit to perform the first conversion operation by turning the third circuit element part off and the fourth circuit element part on, while allowing a current to flow across the first circuit element part from the first power path to the third power path, and the control unit allows a current to flow across the second circuit element part from the intermediate conductive path to the second power path, and if the voltage of the first power path is less than or equal to the first threshold and the failure signal is given from the external device, the control unit causes the voltage conversion unit to perform the second conversion operation by turning the third circuit element part on and the fourth circuit element part off, while interrupting a current flow across the first circuit element part from the third power path to the first power path.

If the voltage of the first power path is less than or equal to the first threshold, the in-vehicle control device can confirm that no failure signal has been given from the external device, and then cause the voltage conversion unit to perform the first conversion operation to charge the second power storage unit. Then, this in-vehicle control device can perform discharge of power via the second circuit element part in parallel with supply of power toward the second power storage unit due to the first conversion operation. On the other hand, if a failure signal is generated when the voltage of the first power path is less than or equal to the first threshold, it is possible to cause the voltage conversion unit to perform the second conversion operation, while interrupting a current flow across the first circuit element part to the first power path. Accordingly, even if a ground fault or the like occurs in the first power path when a failure signal is generated, it is possible to supply power whose voltage was adjusted by the voltage conversion unit to the second power path while suppressing the effect of the failure signal.

In an eleventh aspect, the in-vehicle control device according to any one of the first to the tenth aspects further includes: a fifth circuit element part capable of allowing a current to flow from the third power path to the second power path and interrupting a current flow from the second power path to the third power path.

By causing the voltage conversion unit to perform the second conversion operation with the fifth circuit element part allowing a current to flow from the third power path to the second power path, the in-vehicle control device can supply power to the second power path while applying a desired voltage to the third power path.

First Embodiment

Summary of In-Vehicle System

FIG. 1 shows an in-vehicle system 2. The in-vehicle system 2 shown in FIG. 1 includes an in-vehicle power source system 3 and a load 101. The in-vehicle system 2 is a system that supplies power to the load 101 using the in-vehicle power source system 3, and operates the load 101.

The load 101 is an electrical component installed in a vehicle. The load 101 operates upon receiving power supplied from the in-vehicle power source system 3. There is no limitation to the type of load 101. Various known in-vehicle components can be employed as the load 101. The load 101 may include a plurality of electrical components or may be a single electrical component.

The in-vehicle power source system 3 is a system that supplies power to the load 101. The in-vehicle power source system 3 uses a power source unit 91 or a power storage unit 92 as a power supply source to supply power to the load 101. The in-vehicle power source system 3 can supply power to the load 101 from the power source unit 91, and if the power supply from the power source unit 91 is interrupted, for example, due to its failure, the in-vehicle power source system 3 can supply power to the load 101 from the power storage unit 92. The power storage unit 92 may also be used as a supply source for supplying power to the load 101 when the power supply from the power source unit 91 to the load 101 is not interrupted, depending on the circumstances.

Overview of In-Vehicle Power Source System

The in-vehicle power source system 3 includes the power source unit 91, the power storage unit 92, an in-vehicle control device 10, and the like. Note that in the representative example shown in FIG. 1, a first power path 81, a second power path 82, a third power path 83, a fourth power path 84, a fifth power path 85, and the like are included as constituent elements of the in-vehicle control device 10. However, the first power path 81, the second power path 82, the third power path 83, the fourth power path 84, and the fifth power path 85 may also be, in part or in whole, elements outside the in-vehicle control device 10.

The power source unit 91 is an in-vehicle power source that can supply power to the load 101. The power source unit 91 is configured as a known in-vehicle power storage unit such as a lead battery, for example. The power source unit 91 may also be constituted by a battery other than a lead battery (such as e.g., a lithium-ion battery or other battery), and may include, instead of or in addition to a battery, a power source means other than a battery. In the example in FIG. 1, the positive electrode-side terminal of the power source unit 91 is electrically connected to the first power path 81 in a configuration in which it is shorted to the first power path 81. The negative electrode-side terminal of the power source unit 91 is electrically connected to the ground in a configuration in which it is shorted to the ground. The power source unit 91 applies a DC voltage of a constant value to the first power path 81. The voltage applied to the first power path 81 by the power source unit 91 may vary slightly from the above-mentioned constant value.

The power storage unit 92 is a power source different from the power source unit 91. The power storage unit 92 is a power source that serves as a power supply source at least when the power supply from the power source unit 91 is interrupted. The power storage unit 92 is constituted by a known power storage means such as an electric double layer capacitor (EDLC), for example. The power storage unit 92 may also be constituted by a capacitor other than an electric double layer capacitor, and may also include, instead of or in addition to a capacitor, another storage means (such as a battery). In the example in FIG. 1, the positive electrode-side terminal of the power storage unit 92 is electrically connected to the fifth power path 85 in a configuration in which it is shorted to the fifth power path 85. The negative electrode-side terminal of the power storage unit 92 is electrically connected to the ground in a configuration in which it is shorted to the ground. The output voltage of the power storage unit 92 (voltage applied to the fifth power path 85 by the power storage unit 92) may be greater than, less than, or equal to the output voltage of the power source unit 91 (voltage applied to the first power path 81 by the power source unit 91).

The power storage unit 92 has a first power storage unit 92A and a second power storage unit 92B. The second power storage unit 92B is located on a lower potential side than the first power storage unit 92A and is connected in series with the first power storage unit 92A. The positive electrode-side terminal of the first power storage unit 92A constitutes the positive electrode-side terminal of the power storage unit 92. The negative electrode-side terminal of the first power storage unit 92A is electrically connected to the positive electrode-side terminal of the second power storage unit 92B in a configuration in which it is shorted to the positive electrode-side terminal of the second power storage unit 92B. The negative electrode-side terminal of the second power storage unit 92B constitutes the negative electrode-side terminal of the power storage unit 92.

In the present specification, "voltage" refers to a voltage relative to the ground potential (e.g., 0 V) and is the potential difference from the ground potential, unless otherwise specified. For example, the voltage applied to the first power path 81 is the potential difference between the potential of the first power path 81 and the ground potential.

The output voltage of the power source unit 91 is applied to the first power path 81. The first power path 81 constitutes part or all of the power supply path between the power source unit 91 and a first circuit element part 21. One end of the first power path 81 is electrically connected to the positive electrode-side terminal of the power source unit 91 in a configuration in which it is shorted to that positive electrode-side terminal of the power source unit 91. In the example in FIG. 1, another end of the first power path 81 is electrically connected to one end of the first circuit element part 21 (in the example in FIG. 1, the source terminal serving as one end of a semiconductor switch constituting the first circuit element part 21) in a configuration in which it is shorted to that one end. The first power path 81 may be provided with a relay or a fuse. The first power path 81 functions to make the potentials at the positive electrode-side terminal of the power source unit 91 and the one end of the first circuit element part 21 equal to or substantially equal to each other, for example.

The second power path 82 is a path for supplying power supplied from the first power path 81 to the load 101. The second power path 82 constitutes part or all of the power supply path between a fifth circuit element part 25 and the load 101. One end of the second power path 82 is electrically connected to another end of the fifth circuit element part 25 (in the example in FIG. 1, the drain terminal serving as another end of a semiconductor switch 25B). Another end of the second power path 82 is electrically connected to the load 101 in a configuration in which it is shorted to one end of the load 101. A second other end of the second power path 82 is electrically connected to another end of the second circuit element part 22 (in the example in FIG. 1, the drain terminal serving as another end of a semiconductor switch 22B) in a configuration in which it is shorted to the other end of the second circuit element part 22. The second power path 82 may be provided with a relay or a fuse. The second power path 82 functions to make the potentials at the other end of the fifth circuit element part 25, the other end of the second circuit element part 22, and the one end of the load 101 equal to or substantially equal to each other, for example.

The third power path 83 is a power path that is different from the first power path 81 and the second power path 82. The third power path 83 is provided on the first power path 81 side of the voltage conversion unit 30, and on the second power path 82 side of the voltage conversion unit 30. One end of the third power path 83 is electrically connected to another end of the first circuit element part 21 (in the example in FIG. 1, the drain terminal serving as another end of a semiconductor switch constituting the first circuit element part 21) in a configuration in which it is shorted to the other end of the first circuit element part 21. Another end of the third power path 83 is electrically connected to one end of the voltage conversion unit 30 in a configuration in which it is shorted to the one end of the voltage conversion unit 30. A second other end of the third power path 83 is electrically connected to one end of the fifth circuit element part 25 (in the example in FIG. 1, the drain terminal serving as one end of a semiconductor switch 25A) in a configuration in which it is shorted to the one end of the fifth circuit element part 25. The third power path 83 functions to make the potentials at the other end of the first circuit element part 21, the one end of the fifth circuit element part 25, and the one end of the voltage conversion unit 30 equal to or substantially equal to each other, for example.

The fourth power path 84 is a power path that is different from the first power path 81, the second power path 82, and the third power path 83. The fourth power path 84 is provided on the power storage unit 92 side of the voltage conversion unit 30. One end of the fourth power path 84 is electrically connected to another end of the voltage conversion unit 30 in a configuration in which it is shorted to the other end of the voltage conversion unit 30. Another end of the fourth power path 84 is electrically connected to one end of the third circuit element part 23 (in the example in FIG. 1, the source terminal serving as one end of a semiconductor switch constituting the third circuit element part 23) in a configuration in which it is shorted to the one end of the third circuit element part 23. A second other end of the fourth power path 84 is electrically connected to one end of the fourth circuit element part 24 (in the example in FIG. 1, the drain terminal serving as one end of a semiconductor switch constituting the fourth circuit element part 24) in a configuration in which it is shorted to the one end of the fourth circuit element part 24. The fourth power path 84 functions to make the potentials at the other end of the voltage conversion unit 30, the one end of the third circuit element part 23, and the one end of the fourth circuit element part 24 equal to or substantially equal to each other, for example.

The fifth power path 85 is a power path that is different from the first power path 81, the second power path 82, the third power path 83, and the fourth power path 84. One end of the fifth power path 85 is electrically connected to another end of the third circuit element part 23 (in the example shown in FIG. 1, the drain terminal serving as another end of the semiconductor switch constituting the third circuit element part 23) in a configuration in which it is shorted to the other end of the third circuit element part 23. Another end of the fifth power path 85 is electrically connected to the positive electrode-side terminal of the power storage unit 92 in a configuration in which it is shorted to that positive electrode-side terminal of the power storage unit 92. The fifth power path 85 functions to make the potentials at the other end of the third circuit element part 23 and the positive electrode-side terminal of the power storage unit 92 equal to or substantially equal to each other, for example.

An intermediate conductive path 89 is provided between the first power storage unit 92A and the second power storage unit 92B. One end of the intermediate conductive path 89 is electrically connected to the negative electrode-side terminal of the first power storage unit 92A in a configuration in which it is shorted to that negative electrode-side terminal of the first power storage unit 92A. Another end of the intermediate conductive path 89 is electrically connected to the positive electrode-side terminal of the second power storage unit 92B in a configuration in which it is shorted to that positive electrode-side terminal of the second power storage unit 92B. A second other end of the intermediate conductive path 89 is electrically connected to another end of the fourth circuit element part 24 (in the example shown in FIG. 1, the source terminal serving as another end of the semiconductor switch constituting the fourth circuit element part 24) in a configuration in which it is shorted to the other end of the fourth circuit element part 24. A third other end of the intermediate conductive path 89 is electrically connected to one end of the second circuit element part 22 (in the example in FIG. 1, the drain terminal serving as one end of the semiconductor switch 22A) in a configuration in which it is shorted to the one end of the second circuit element part 22. The intermediate conductive path 89 functions to make the potentials at the negative electrode-side terminal of the first power storage unit 92A, the positive electrode-side terminal of the second power storage unit 92B, the other end of the fourth circuit element part 24, and the one end of the second circuit element part 22 equal to or substantially equal to each other, for example.

Details of In-Vehicle Control Device

The in-vehicle control device 10 is a device that is used in the in-vehicle system 2 and controls power supply from the power storage unit 92. The in-vehicle control device 10 is a backup control device that can control a backup operation for outputting power from the power storage unit 92. The in-vehicle control device 10 includes the first power path 81, the second power path 82, the third power path 83, the fourth power path 84, the fifth power path 85, a control unit 16, the voltage conversion unit 30, the first circuit element part 21, the second circuit element part 22, the third circuit element part 23, the fourth circuit element part 24, the fifth circuit element part 25, voltage detection units 41, 43, and 44, and the like.

In the representative example in FIG. 1, the first circuit element part 21 is constituted by one semiconductor switch. The second circuit element part 22 is constituted by two semiconductor switches 22A and 22B. The third circuit element part 23 is constituted by one semiconductor switch. The fourth circuit element part 24 is constituted by one semiconductor switch. The fifth circuit element part 25 is constituted by two semiconductor switches 25A and 25B. In the example in FIG. 1, the semiconductor switches constituting the first circuit element part 21, the second circuit element part 22, the third circuit element part 23, the fourth circuit element part 24, and the fifth circuit element part 25 are N-channel Field Effect Transistors (FETs).

The first circuit element part 21 is configured to allow a current to flow from the first power path 81 to the third power path 83 (i.e., the voltage conversion unit 30 side) and to interrupt a current flow from the third power path 83 (i.e., the voltage conversion unit 30 side) to the first power path 81. In the example in FIG. 1, the drain of the first circuit element part 21 is electrically connected to the third power path 83 so as to be shorted thereto, and the source of the first circuit element part 21 is electrically connected to the first power path 81 so as to be shorted thereto. When the first circuit element part 21 is on, a current is allowed to flow through the first circuit element part 21 in both directions. When the first circuit element part 21 is off, a current flow from the third power path 83 to the first power path 81 via the first circuit element part 21 is interrupted.

The second circuit element part 22 can allow a current to flow from the intermediate conductive path 89 to the second power path 82. The second circuit element part 22 can interrupt a current flow from the second power path 82 to the intermediate conductive path 89. The semiconductor switches 22A and 22B constituting the second circuit element part 22 are connected to each other in opposite orientations. In the example in FIG. 1, the drain of the semiconductor switch 22A is shorted to the intermediate conductive path 89, the drain of the semiconductor switch 22B is shorted to the second power path 82, and the source of the semiconductor switch 22A and the source of semiconductor switch 22B are shorted to each other. A state where the second circuit element part 22 is off means that both the semiconductor switches 22A and 22B are off. When the second circuit element part 22 is off, a current flow through the second circuit element part 22 is interrupted in both directions, namely, both a current flow from the second power path 82 to the intermediate conductive path 89 via the second circuit element part 22 and a current flow from the intermediate conductive path 89 to the second power path 82 via the second circuit element part 22 are interrupted. A state where the second circuit element part 22 is on means that both the semiconductor switches 22A and 22B are on. When the second circuit element part 22 is on, a current is allowed to flow through the second circuit element part 22 in both directions, namely, both a current flow from the second power path 82 to the intermediate conductive path 89 and a current flow from the intermediate conductive path 89 to the second power path 82 are allowed.

The third circuit element part 23 is provided between the fourth power path 84 and the fifth power path 85. In other words, the third circuit element part 23 is provided between the voltage conversion unit 30 and the power storage unit 92. The third circuit element part 23 interrupts a current flow from the fifth power path 85 to the fourth power path 84 via the third circuit element part 23 itself when it is off. The third circuit element part 23 allows a current to flow from the fifth power path 85 to the fourth power path 84 via the third circuit element part 23 itself when it is on. When the third circuit element part 23 is on, a current is allowed to flow through the third circuit element part 23 in both directions. When the third circuit element part 23 is on, the voltage of the fourth power path 84 is the same as the voltage of the power storage unit 92. In other words, when the third circuit element part 23 is on, the output voltage of the power storage unit 92 is applied to the fourth power path 84.

The fourth circuit element part 24 is provided in parallel with the arrangement in which the third circuit element part 23 and the first power storage unit 92A are connected in series. The fourth circuit element part 24 interrupts a current flow from the fourth power path 84 to the intermediate conductive path 89 via the fourth circuit element part 24 itself when it is off. The fourth circuit element part 24 allows a current to flow from the fourth power path 84 to the intermediate conductive path 89 via the fourth circuit element part 24 itself when it is on. When the fourth circuit element part 24 is on, a current is allowed to flow through the fourth circuit element part 24 in both directions. When the fourth circuit element part 24 is on, the voltage of the fourth power path 84 is the same as the voltage of the second power storage unit 92B. In other words, when the fourth circuit element part 24 is on, the output voltage of the second power storage unit 92B is applied to the fourth power path 84.

The fifth circuit element part 25 can allow a current to flow from the third power path 83 (i.e., the voltage conversion unit 30 side) to the second power path 82. The fifth circuit element part 25 can interrupt a current flow from the second power path 82 to the third power path 83 (i.e., the voltage conversion unit 30 side). The semiconductor switches 25A and 25B constituting the fifth circuit element part 25 are connected to each other in opposite orientations. In the example in FIG. 1, the drain of the semiconductor switch 25A is shorted to the third power path 83, the drain of the semiconductor switch 25B is shorted to the second power path 82, and the source of the semiconductor switch 25A and the source of semiconductor switch 25B are shorted to each other. A state where the fifth circuit element part 25 is off means that both the semiconductor switches 25A and 25B are off. When the fifth circuit element part 25 is off, a current flow through the fifth circuit element part 25 is interrupted in both directions, namely, both a current flow from the second power path 82 to the third power path 83 (i.e., the voltage conversion unit 30 side) and a current flow from the third power path 83 (i.e., the voltage conversion unit 30 side) to the second power path 82 are interrupted. A state where the fifth circuit element part 25 is on means that both the semiconductor switches 25A and 25B are on. When the fifth circuit element part 25 is on, a current is allowed to flow through the fifth circuit element part 25 in both directions, namely, both a current flow from the second power path 82 to the third power path 83 (i.e., the voltage conversion unit 30 side) and a current flow from the third power path 83 side (i.e., the voltage conversion unit 30 side) to the second power path 82 are allowed.

The voltage conversion unit 30 is constituted by a known voltage conversion circuit such as a DCDC converter, for example. In the example in FIG. 1, the voltage conversion unit 30 performs voltage conversion between the third power path 83 and the fourth power path 84. The voltage conversion unit 30 is a device that performs a first conversion operation of converting a voltage applied to the third power path 83 so as to step up or down the voltage and applying the output voltage to the fourth power path 84, and a second conversion operation of converting a voltage applied to the fourth power path 84 so as to step up or down the voltage and applying the output voltage to the third power path 83. Thus, the voltage conversion unit 30 performs voltage conversion in both directions. The operation of the voltage conversion unit 30 is controlled by the control unit 16.

The control unit 16 controls the first circuit element part 21, the second circuit element part 22, the third circuit element part 23, the fourth circuit element part 24, the fifth circuit element part 25, and the voltage conversion unit 30. The control unit 16 includes an information processing device having an information processing function, a calculation function, a control function, and the like. A common device or a plurality of devices may be used to control the first circuit element part 21, the second circuit element part 22, the third circuit element part 23, the fourth circuit element part 24, the fifth circuit element part 25, and the voltage conversion unit 30.

The voltage detection unit 41 is a circuit that gives, to the control unit 16, a detected value (e.g., an analog voltage value) that can specify the value of the voltage applied to the first power path 81. The voltage detection unit 43 is a circuit that gives, to the control unit 16, a detected value (e.g., an analog voltage value) that can specify the value of the voltage applied to the third power path 83. The voltage detection unit 44 is a circuit that gives, to the control unit 16, a detected value (e.g., an analog voltage value) that can specify the value of the voltage applied to the fourth power path 84.

The control unit 16 can specify the output voltage of the power storage unit 92 based on the detected value of the voltage detection unit 44 when the third circuit element part 23 is on and the fourth circuit element part 24 is off. The control unit 16 can specify the output voltage of the second power storage unit 92B based on the detected value of the voltage detection unit 44 when the third circuit element part 23 is off and the fourth circuit element part 24 is on.

Operation of In-Vehicle Control Device

Figure 2:
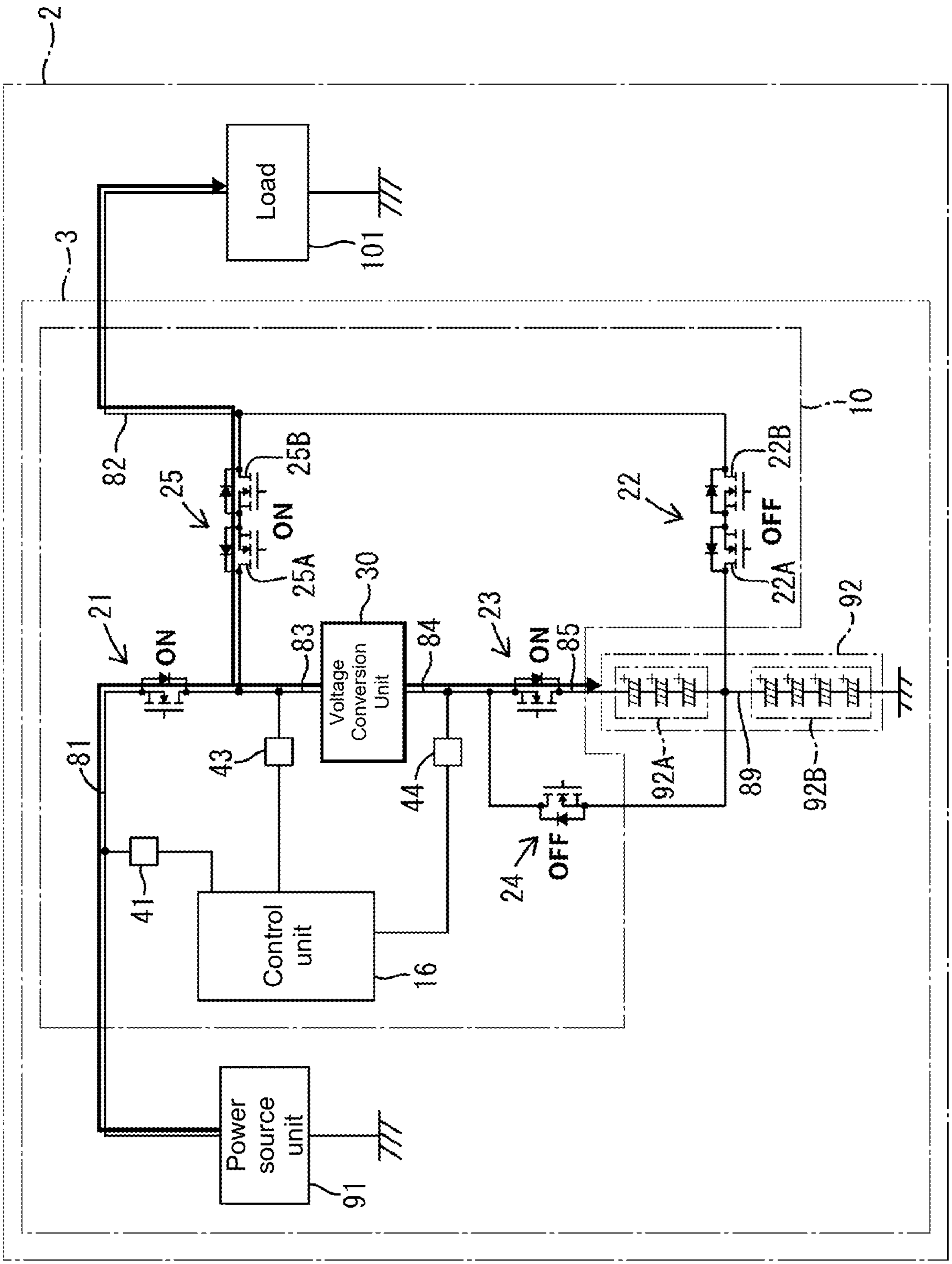
FIG. 2 is an illustrative diagram illustrating an example of operation in which a power storage unit is charged when a first power path is in a normal state.

The control unit 16 turns on the first circuit element part 21 and the fifth circuit element part 25 when the vehicle is started. With this, as shown in FIG. 2, power from the power source unit 91 is supplied to the second power path 82 via the first circuit element part 21 and the fifth circuit element part 25. Note that the control unit 16 maintains the second circuit element part 22 in the off state even after the vehicle is started. The control unit 16 can recognize that the vehicle was started by receiving a signal indicating the on/off state of a start switch or by receiving a signal output from an external ECU at the start of the vehicle. The start switch is an ignition switch, power switch, or the like.

Furthermore, if the voltage of the power storage unit 92 is less than a predetermined lower limit voltage, the control unit 16 causes the voltage conversion unit 30 to perform the first conversion operation so that the voltage to be applied to the fourth power path 84 reaches a first target value, while turning the third circuit element part 23 on and the fourth circuit element part 24 off. With this, as shown in FIG. 2, the power from the power source unit 91 is subjected to the voltage conversion by the voltage conversion unit 30 and is supplied to the power storage unit 92, so that the power storage unit 92 is charged. The lower limit voltage is at least 0 V. The first target value is a value greater than the lower limit voltage. The first target value may be greater than the rated voltage of the load 101.

Figure 3:
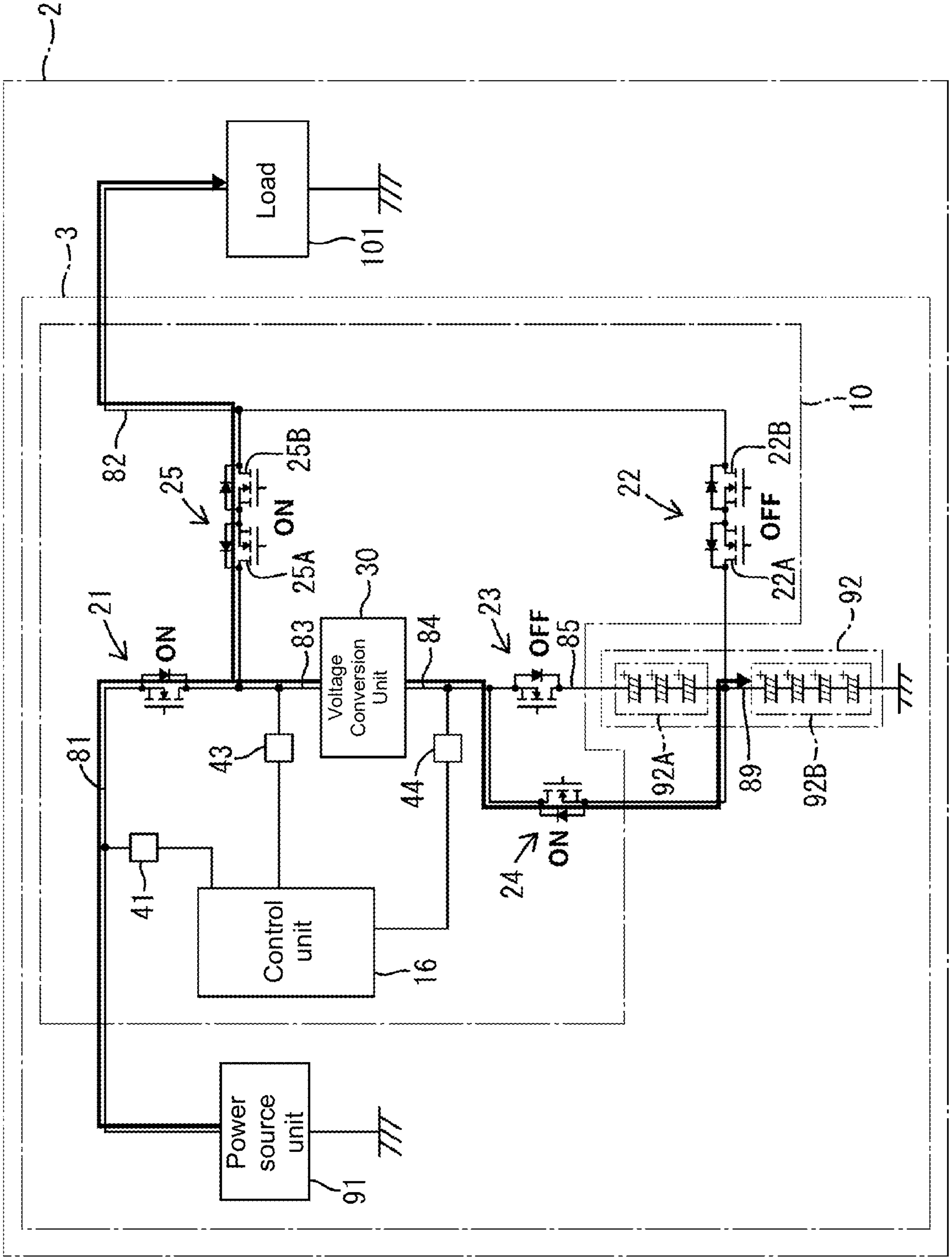
FIG. 3 is an illustrative diagram illustrating an example of operation in which a second power storage unit is supplied with power when the first power path is in the normal state.

If the voltage of the power storage unit 92 is a charge completion voltage, which is higher than or equal to the lower limit voltage, the control unit 16 switches the third circuit element part 23 to the off state and the fourth circuit element part 24 to the on state, and switches the target voltage of the voltage conversion unit 30 from the first target value to a second target value. In other words, if the voltage of the power storage unit 92 is the charge completion voltage, the control unit 16 causes the voltage conversion unit 30 to perform the first conversion operation so that the voltage to be applied to the fourth power path 84 is the second target value, which is smaller than the first target value, while turning the third circuit element part 23 off and the fourth circuit element part 24 on. With this, as shown in FIG. 3, the power from the power source unit 91 is subjected to the voltage conversion by the voltage conversion unit 30 and is supplied to the second power storage unit 92B via the fourth circuit element part 24. The control unit 16 waits while maintaining this condition. The charge completion voltage may be the same as or greater than the lower limit voltage. The charge completion voltage may also be the same as or less than the first target value.

The control unit 16 may charge the second power storage unit 92B without charging the entire power storage unit 92 if the voltage of the power storage unit 92 is the lower limit voltage or higher at the start of the vehicle. In other words, if the voltage of the power storage unit 92 is the lower limit voltage or higher, the control unit 16 may cause the voltage conversion unit 30 to perform the first conversion operation so that the voltage to be applied to the fourth power path 84 is the second target value, which is smaller than the first target value, while turning the third circuit element part 23 off and the fourth circuit element part 24 on.

If the voltage of the first power path 81 is above the first threshold and less than an overvoltage threshold, which is greater than the first threshold, the control unit 16 performs the above-described operations (specifically, an operation of supplying power to the second power path 82 via the fifth circuit element part 25 and an operation of supplying power to the power storage unit 92 or the second power storage unit 92B).

Figure 4:
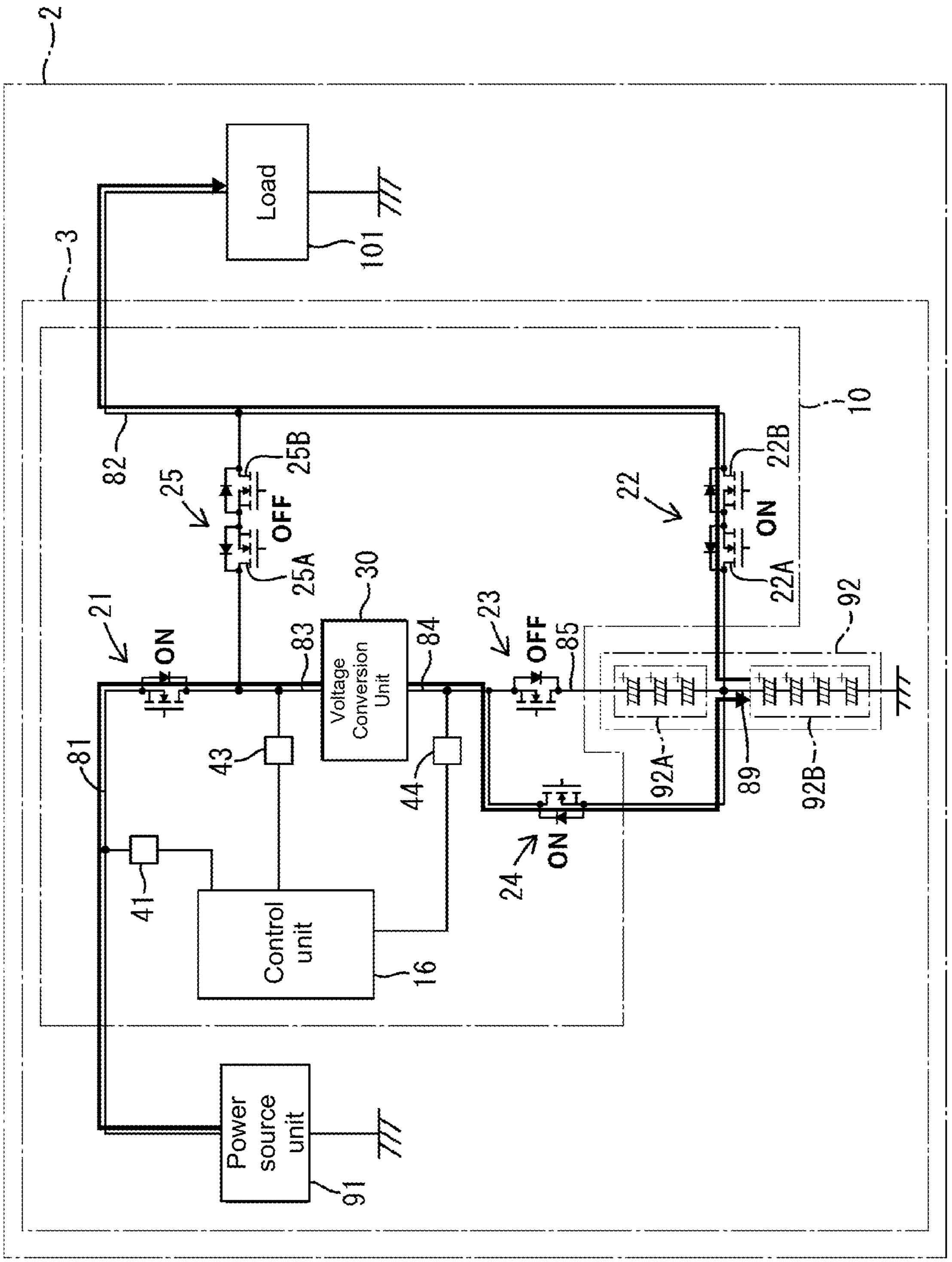
FIG. 4 is an illustrative diagram illustrating an example of operation in which power from a power source unit is subjected to voltage conversion by a voltage conversion unit and is supplied to a second power path.

If the voltage of the first power path 81 is the predetermined overvoltage threshold or higher, the control unit 16 causes the voltage conversion unit 30 to perform the first conversion operation, while turning the first circuit element part 21 on, the second circuit element part 22 on, the third circuit element part 23 off, the fourth circuit element part 24 on, and the fifth element part 25 off. With this, if the voltage of the first power path 81 rises to a voltage that is higher than or equal to the overvoltage threshold, as shown in FIG. 4, the power from the power source unit 91 is subjected to the voltage conversion by the voltage conversion unit 30 and is supplied to the second power path 82 via the fourth circuit element part 24 and the second circuit element part 22. The control unit 16 increases the power to be supplied from the voltage conversion unit 30 toward the intermediate conductive path 89 via the fourth circuit element part 24 to a value that is greater than power to be supplied to the second power path 82 via the second circuit element part 22.

If a predetermined failure determination condition is not satisfied when the voltage of the first power path 81 is the first threshold or less, the control unit 16 causes the voltage conversion unit 30 to perform the first conversion operation, while turning the first circuit element part 21 on, the second circuit element part 22 on, the third circuit element part 23 off, the fourth circuit element part 24 on, and the fifth circuit element part 25 off. With this, as shown in FIG. 4, power from the power source unit 91 is subjected to the voltage conversion by the voltage conversion unit 30, and is supplied to the second power path 82 via the fourth circuit element part 24 and the second circuit element part 22. The control unit 16 increases the power to be supplied from the voltage conversion unit 30 toward the intermediate conductive path 89 via the fourth circuit element part 24 to a value that is greater than the power to be supplied to the second power path 82 via the second circuit element part 22.

Figure 6:
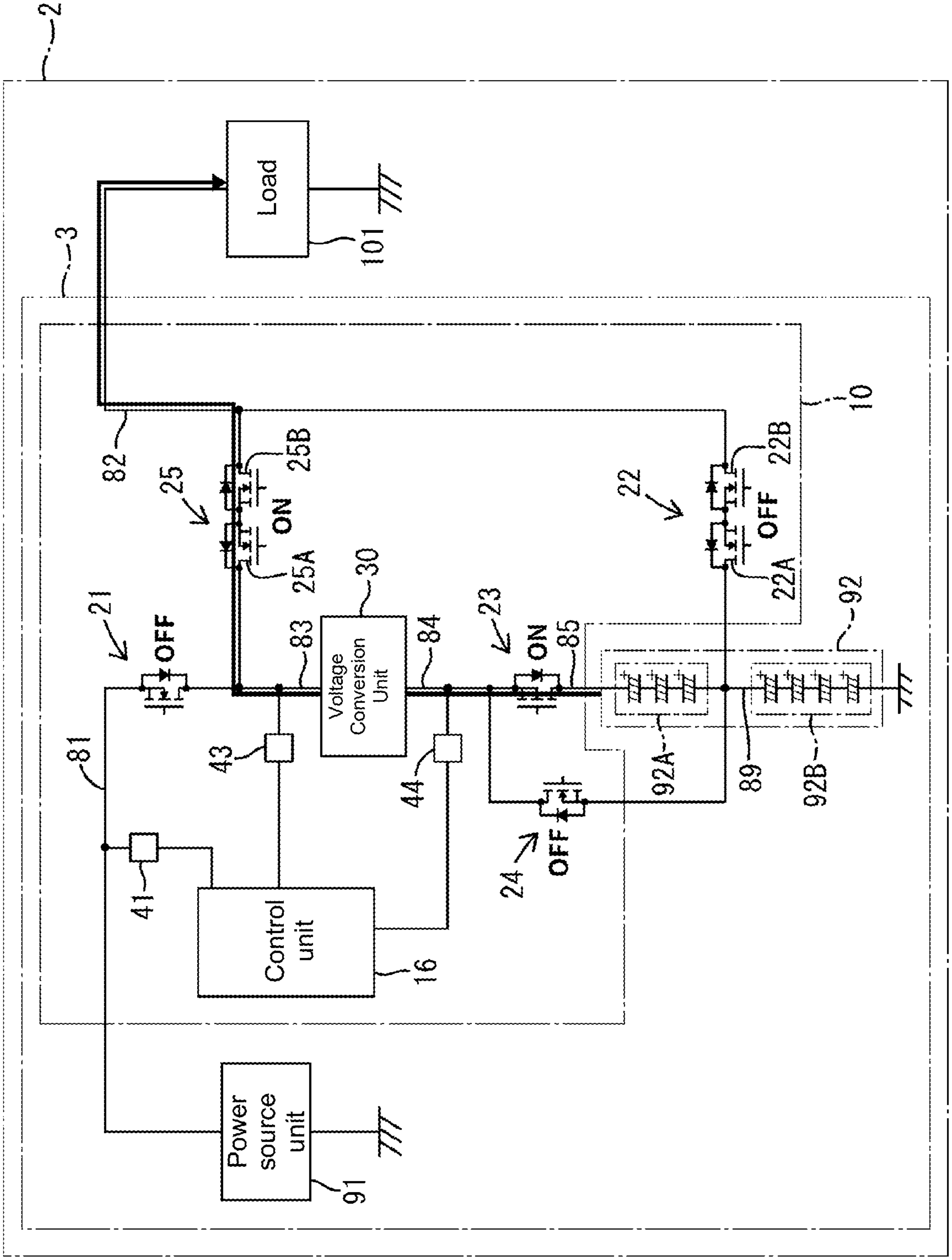
FIG. 6 is an illustrative diagram illustrating an example of power supply operation executed by the in-vehicle control device of the first embodiment after a certain amount of time has elapsed since the failure determination condition was satisfied.

If the failure determination condition is satisfied when the voltage of the first power path 81 is the first threshold or less, the control unit 16 causes the voltage conversion unit 30 to perform the second conversion operation, while turning the first circuit element part 21 off, the second circuit element part 22 off, the third circuit element part 23 on, the fourth circuit element part 24 off, and the fifth circuit element part 25 on. With this, as shown in FIG. 6, power from the power storage unit 92 is subjected to the voltage conversion by the voltage conversion unit 30, and is supplied to the second power path 82 via the fifth circuit element part 25.

Figure 5:
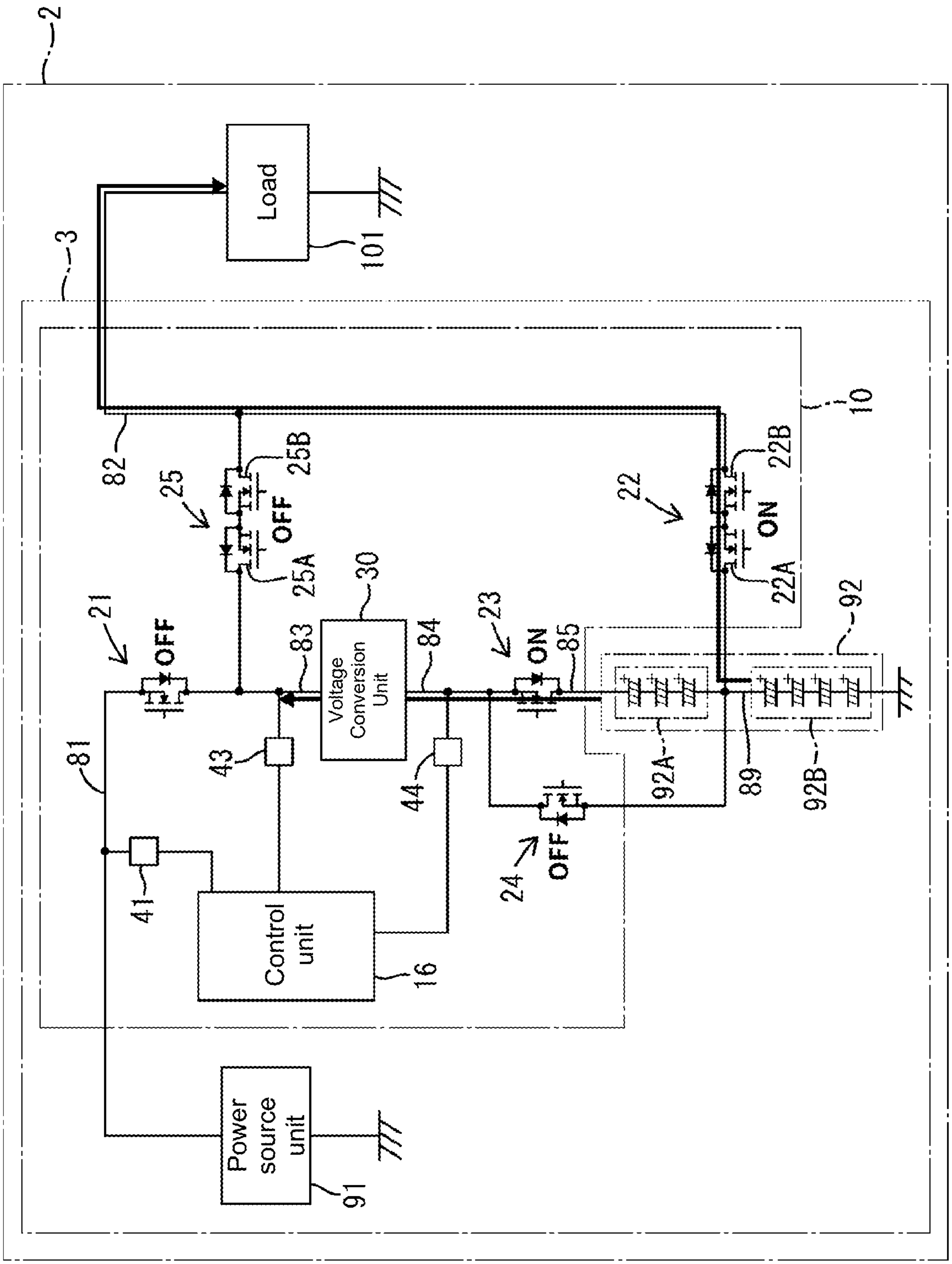
FIG. 5 is an illustrative diagram illustrating an example of power supply operation executed by the in-vehicle control device of the first embodiment when the first power path has a value not greater than a first threshold and immediately after a failure determination condition is satisfied.

More specifically, if the state is switched from the state where the failure determination condition is not satisfied to the state where it is satisfied when the voltage of the first power path 81 is the first threshold or less, the control unit 16 maintains the second circuit element part 22 in the on state before and after the switching. With this, as shown in FIG. 5, power from the second power storage unit 92B is supplied to the second power path 82 via the second circuit element part 22. After the switching, the control unit 16 turns off the first circuit element part 21, on the second circuit element part 22, on the third circuit element part 23, off the fourth circuit element part 24, and off the fifth circuit element part 25, and causes the voltage conversion unit 30 to perform the second conversion operation. If the voltage conversion unit 30 satisfies a predetermined operation condition after the switching, the control unit 16 switches the fifth circuit element part 25 to the on state. With this, as shown in FIG. 6, power from the power storage unit 92 is subjected to the voltage conversion by the voltage conversion unit 30, and is supplied to the second power path 82 via the fifth circuit element part 25. Also, the control unit 16 switches the second circuit element part 22 to the off state.

The predetermined operating condition may be, for example, that the output voltage of the voltage conversion unit 30 has reached a predetermined operation start voltage, or that a predetermined time has elapsed since the above-mentioned switching occurred, or may be any other condition.

The above-described failure determination condition may include the condition that a current flows from the voltage conversion unit 30 toward the first power path 81 via the first circuit element part 21. The failure determination condition may also include the condition that the voltage of the first power path 81 is less than or equal to a second threshold, which is lower than the first threshold. The failure determination condition may also include the condition that a predetermined failure signal is given to the in-vehicle control device 10 from an external device other than the in-vehicle control device 10.

Examples of Advantageous Effects

By causing the voltage conversion unit 30 to perform the first conversion operation with the first circuit element part 21 allowing a current to flow from the first power path 81 to the third power path 83, the in-vehicle control device 10 can charge the power storage unit 92 while applying a desired voltage to the fourth power path 84. Also, by causing the voltage conversion unit 30 to perform the second conversion operation with the fifth circuit element part 25 allowing a current to flow from the third power path 83 to the second power path 82, the in-vehicle control device 10 can supply power to the second power path 82 while applying a desired voltage to the third power path 83. In other words, the in-vehicle control device 10 can adjust a charging voltage when charging the power storage unit 92 and a discharging voltage when discharging the power storage unit 92 with a simpler configuration, and in some cases, the first circuit element part 21 can interrupt a current flow from the third power path 83 to the first power path 81. Furthermore, since the second circuit element part 22 is provided and can allow a current to flow from the intermediate conductive path 89 between the first power storage unit 92A and the second power storage unit 92B to the second power path 82, it is possible to discharge the second power storage unit 92B through a path other than the path in which the voltages are adjusted by the voltage conversion unit 30. Furthermore, since the second circuit element part 22 can interrupt a current flow from the second power path 82 to the intermediate conductive path 89, it is possible to interrupt a current flow into the second power storage unit 92B from the second power path 82 through the second circuit element part 22 in some cases. Furthermore, according to the configuration in which the second power storage unit 92B is discharged via the second circuit element part 22, the output voltage is reduced compared to the configuration in which the power storage unit 92 is directly discharged. Therefore, it is easier to prevent the voltage to be input to the load 101 from exceeding the rated voltage of the load 101.

The in-vehicle control device 10 can selectively supply power from the voltage conversion unit 30 to the power storage unit 92, and to the second power storage unit 92B with the first power storage unit 92A bypassed.

Since the power is supplied to the intermediate conductive path 89 via the first circuit element part 21 and the fourth circuit element part 24 even if a current flows from the intermediate conductive path 89 to the second power path 82 via the second circuit element part 22, the in-vehicle control device 10 can suppress a voltage drop in the second power storage unit 92B. This can also suppress a voltage rise in the first power storage unit 92A caused by the voltage drop in the second power storage unit 92B, which in turn can suppress, for example, deteriorations in the first power storage unit 92A.

The in-vehicle control device 10 can supply larger power to the intermediate conductive path 89 even if a current flows from the intermediate conductive path 89 to the second power path 82 via the second circuit element part 22. Therefore, the in-vehicle control device 10 can supply power to the second power path 82 while ensuring a charging current to the second power storage unit 92B more reliably.

The in-vehicle control device 10 can charge the power storage unit 92 with power from the voltage conversion unit 30 when the voltage of the power storage unit 92 is less than the lower limit voltage, and can supply power to the second power storage unit 92B at a lower output voltage when the power storage unit 92 reaches the charge completion voltage.

If the failure determination condition is not satisfied even when the voltage of the first power path 81 has dropped to a value less than or equal to the first threshold, the in-vehicle control device 10 can subject power from the power source unit 91 to voltage conversion by the voltage conversion unit 30 to supply the converted voltage toward the intermediate conductive path 89, while supplying power from the second power storage unit 92B to the second power path 82 via the second circuit element part 22. On the other hand, if the failure determination condition is satisfied, the in-vehicle control device 10 can subject the power from the power storage unit 92 to voltage conversion by the voltage conversion unit 30 to supply the converted voltage to the second power path 82, while interrupting a reverse flow toward the first power path 81.

If the voltage of the first power path 81 is less than or equal to the first threshold and the state is changed to the state where the failure determination condition is not satisfied, the in-vehicle control device 10 can turn on the second circuit element part 22 to quickly supply power to the second power path 82 from the second power storage unit 92B. If the state is switched from the state where the failure determination condition is not satisfied to the state where the failure determination condition is satisfied when the voltage of the first power path 81 is less than or equal to the first threshold, the in-vehicle control device 10 can supply, after the switching, power whose voltage was adjusted by the second conversion operation to the second power path 82 via the third power path 83, while preventing a reverse flow toward the first power path 81. Moreover, since the in-vehicle control device 10 can maintain the second circuit element part 22 in the on state before and after the switching, it is possible to maintain power supply from the second power storage unit 92B to the second power path 82 via the second circuit element part 22 even if the output of the voltage conversion unit 30 rises slowly after the switching. Furthermore, if the voltage conversion unit 30 satisfies a predetermined operation condition after the switching, the in-vehicle control device 10 can switch the second circuit element part 22 to the off state to narrow down the discharge path to the third power path 83, from among the path of the second circuit element part 22 and the third power path 83.

In the configuration in which the failure determination condition includes the condition that a current flows from the voltage conversion unit 30 toward the first power path 81 via the first circuit element part 21, the following effects can be achieved: If the voltage of the first power path 81 is less than or equal to the first threshold, the in-vehicle control device 10 confirms that no current flows to the first power path 81 via the first circuit element part 21, i.e., it is not highly likely that a ground fault has occurred in the first power path 81, and then causes the voltage conversion unit 30 to perform the first conversion operation to charge the second power storage unit 92B. Then, the in-vehicle control device 10 can discharge power via the second circuit element part 22 in parallel with supply of power toward the second power storage unit 92B due to the first conversion operation. On the other hand, if a current flows to the first power path 81 via the first circuit element part 21 when the voltage of the first power path 81 is less than or equal to the first threshold, i.e., if it is highly likely that a ground fault has occurred in the first power path 81, the in-vehicle control device 10 can interrupt a current flow across the first circuit element part 21 to the first power path 81 and can suppress the ground fault from affecting the third power path 83. Then, by causing the voltage conversion unit 30 to perform the second conversion operation, it is possible to supply power whose voltage was adjusted by the voltage conversion unit 30 to the second power path 82 while suppressing the effect of the ground fault.

In the configuration in which the failure determination condition includes the condition that the voltage of the first power path 81 is less than or equal to the second threshold, which is lower than the first threshold, the following effects can be achieved: If the voltage of the first power path 81 is less than or equal to the first threshold, the in-vehicle control device 10 can confirm that the voltage exceeds the second threshold, i.e., the voltage of the first power path 81 is not too low, and then cause the voltage conversion unit 30 to perform the first conversion operation to charge the second power storage unit 92B. Then, the in-vehicle control device 10 can perform discharge of power via the second circuit element part 22 in parallel with supply of power to the second power storage unit 92B due to the above-mentioned first conversion operation. On the other hand, if the voltage of the first power path 81 is less than or equal to the second threshold, i.e., if the voltage of the first power path 81 is too low, it is possible to interrupt a current flow across the first circuit element part 21 to the first power path 81, and thus even if a ground fault occurs in the first power path 81, it is possible to suppress the ground fault from affecting the third power path 83. Then, by causing the voltage conversion unit 30 to perform the second conversion operation, it is possible to supply power whose voltage was adjusted by the voltage conversion unit 30 to the second power path 82 while suppressing the effect of the voltage drop in the first power path 81.

In the configuration in which the failure determination condition includes the condition that a predetermined failure signal is given to the in-vehicle control device 10 from an external device other than the in-vehicle control device 10, the following effects can be achieved: If the voltage of the first power path 81 is less than or equal to the first threshold, the in-vehicle control device 10 can confirm that no failure signal has been given from the external device, and then cause the voltage conversion unit 30 to perform the first conversion operation to charge the second power storage unit 92B. Then, the in-vehicle control device 10 can discharge power via the second circuit element part 22 in parallel with supply of power to the second power storage unit 92B due to the first conversion operation. On the other hand, if a failure signal is generated when the voltage of the first power path 81 is less than or equal to the first threshold, it is possible to cause the voltage conversion unit 30 to perform the second conversion operation, while interrupting a current flow across the first circuit element part 21 to the first power path 81. Accordingly, even if a ground fault or the like occurs in the first power path 81 when a failure signal is generated, it is possible to supply power whose voltage was adjusted by the voltage conversion unit 30 to the second power path 82 while suppressing the effect of the failure signal.

By causing the voltage conversion unit 30 to perform the second conversion operation with the fifth circuit element part 25 allowing a current to flow from the voltage conversion unit 30 to the second power path 82, the in-vehicle control device 10 can supply power to the second power path 82 while applying a desired voltage to the third power path 83.

Other Embodiments

The present disclosure is not limited to the embodiments described with reference to the above description and the drawings. For example, the features of the embodiments described above or below can be combined in any way as long as they do not contradict each other. Also, any feature of the embodiments described above or below can be omitted if it is not explicitly indicated as an essential feature. Furthermore, the above-described embodiments may be modified as follows.

In the above-mentioned embodiments, the power storage unit 92 is provided outside the in-vehicle control device 10, but a configuration is also possible in which the power storage unit 92 is included in the in-vehicle control device 10.

The fifth circuit element part 25 may also be omitted. In other words, there may be no element interposed between the third power path 83 and the second power path 82. For example, the third power path 83 and the second power path 82 may be configured to be shorted.

Although, in the above-described embodiment, the first circuit element part 21 includes a single FET, the present disclosure is not limited to this example. For example, the configuration of FIG. 7(A) may also be employed and the first circuit element part 21 may be constituted only by a diode 191. In this case, a conductive path 181A need only be electrically connected to the first power path 81 and a conductive path 181B need only be the third power path 83. Alternatively, the configuration of FIG. 7(B) may be employed and the first circuit element part 21 may be a switch part in which a switch element 192A (e.g., FET) and a diode 192B are connected in series to each other. In this case, a conductive path 182A need only be electrically connected to the first power path 81 and a conductive path 182B need only be the third power path 83. Alternatively, the configuration of FIG. 7(D) may be employed and the first circuit element part 21 may be a switch part 194 constituted by a known semiconductor switch, other than a FET, or mechanical relay. In this case, a conductive path 184A need only be electrically connected to the first power path 81 and a conductive path 184B need only be the third power path 83. Alternatively, the configuration of FIG. 7(E) may be employed and the first circuit element part 21 may be constituted by two semiconductor switches 195A and 195B. In this case, a conductive path 185A need only be electrically connected to the first power path 81 and a conductive path 185B need only be the third power path 83. The two semiconductor switches 195A and 195B may be, for example, FETs, and may be arranged so that their sources are shorted.

Figure 7:
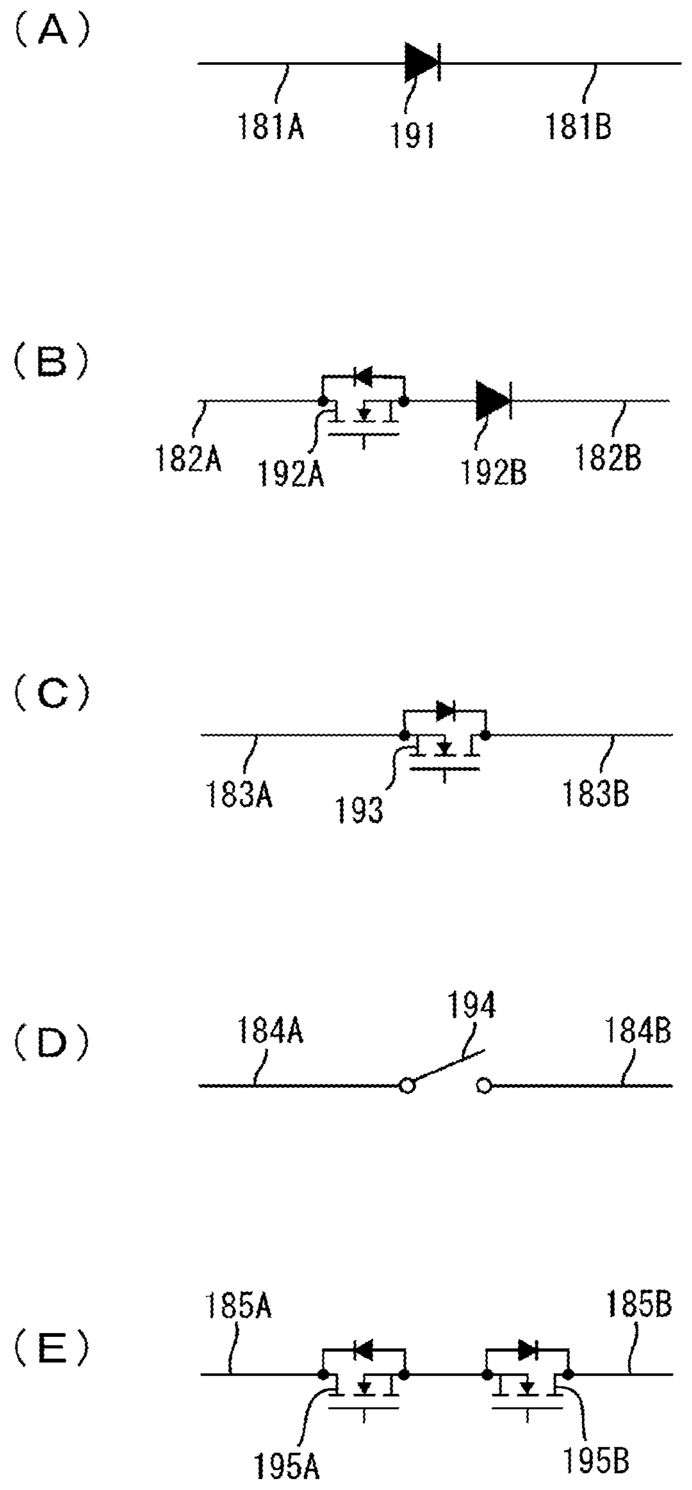
FIG. 7 is an illustrative diagram showing modifications of circuit element parts.

In the above-described embodiments, the second circuit element part 22 includes two FETs, but the configuration of FIG. 7(A) may be employed and the second circuit element part 22 may be constituted only by the diode 191. In this case, the conductive path 181A need only be electrically connected to the fourth power path 84 and the conductive path 181B need only be electrically connected to the second power path 82. Alternatively, the configuration of FIG. 7(B) may be employed and the second circuit element part 22 may be a switch part in which the switch element 192A (e.g., FET) and the diode 192B are connected in series to each other. In this case, the conductive path 182A need only be electrically connected to the fourth power path 84 and the conductive path 182B need only be electrically connected to the second power path 82. Alternatively, the configuration of FIG. 7(C) may be employed and the second circuit element part 22 may only include the switch element 193 (e.g., FET). In this case, the conductive path 183A need only be electrically connected to the fourth power path 84 and the conductive path 183B need only be electrically connected to the second power path 82. Alternatively, the configuration of FIG. 7(D) may be employed and the second circuit element part 22 may be the switch part 194 constituted by a known semiconductor switch, other than a FET, or mechanical relay. In this case, the conductive path 184A need only be electrically connected to the fourth power path 84 and the conductive path 184B need only be electrically connected to the second power path 82.

Although, in the above-described embodiment, the third circuit element part 23 includes a single FET, the present disclosure is not limited to this example. Alternatively, the configuration of FIG. 7(D) may be employed and the third circuit element part 23 may be the switch part 194 constituted by a known semiconductor switch, other than a FET, or mechanical relay. In this case, the conductive path 184A need only be the fourth power path 84 and the conductive path 184B need only be the fifth power path 85. Alternatively, the configuration of FIG. 7(E) may be employed and the third circuit element part 23 may also be constituted by two semiconductor switches 195A and 195B. In this case, the conductive path 185A need only be the fourth power path 84 and the conductive path 185B need only be the fifth power path 85. The two semiconductor switches 195A and 195B may be, for example, FETs, and may be arranged so that their sources are shorted.

Although, in the above-described embodiment, the fourth circuit element part 24 includes a single FET, the present disclosure is not limited to this example. Alternatively, the configuration of FIG. 7(D) may be employed and the fourth circuit element part 24 may be the switch part 194 constituted by a known semiconductor switch, other than a FET, or mechanical relay. In this case, the conductive path 184A need only be electrically connected to the fourth power path 84 and the conductive path 184B need only be electrically connected to the intermediate conductive path 89. Alternatively, the configuration of FIG. 7(E) may be employed and the fourth circuit element part 24 may be constituted by two semiconductor switches 195A and 195B. In this case, the conductive path 185A need only be electrically connected to the fourth power path 84 and the conductive path 185B need only be electrically connected to the intermediate conductive path 89. The two semiconductor switches 195A and 195B may be, for example, FETs, and may be arranged so that their sources are shorted.

In the above-mentioned embodiments, the fifth circuit element part 25 is constituted by two FETs, but as shown in FIG. 7(A), the fifth circuit element part 25 may also be constituted only by the diode 191. In this case, the conductive path 181A need only be electrically connected to the third power path 83 and the conductive path 181B need only be electrically connected to the second power path 82. Alternatively, as shown in FIG. 7(B), the fifth circuit element part 25 may be a switch part in which the switch element 192A (e.g., FET) and the diode 192B are connected in series to each other. In this case, the conductive path 182A need only be electrically connected to the third power path 83 and the conductive path 182B need only be electrically connected to the second power path 82. Alternatively, as shown in FIG. 7(C), the fifth circuit element part 25 may only include the switch element 193 (e.g., FET). In this case, the conductive path 183A need only be electrically connected to the third power path 83 and the conductive path 183B need only be electrically connected to the second power path 82. Alternatively, as shown in FIG. 7(D), the fifth circuit element part 25 may be the switch part 194 constituted by a known semiconductor switch, other than a FET, or mechanical relay. In this case, the conductive path 184A need only be electrically connected to the third power path 83 and the conductive path 184B need only be electrically connected to the second power path 82.

The embodiments disclosed herein are in all respects to be considered illustrative and not restrictive. The scope of the disclosure is not limited to the embodiments disclosed herein, but is indicated by the claims, which are intended to include all modifications within the meaning and scope equivalent to the claims.

The invention claimed is:

1. An in-vehicle control device for use in an in-vehicle system that is provided with: a power source unit for supplying power; a power storage unit that is different from the power source unit; a first power path to which power from the power source unit is supplied; and a second power path serving as a path for supplying power supplied from the first power path to a load, the in-vehicle control device being configured to control power supply from the power storage unit and comprising:

a voltage conversion unit that is provided between the second power path and the power storage unit, and is configured to perform a first conversion operation of converting a voltage applied to a third power path provided on a second power path side and applying an output voltage to a fourth power path provided on a power storage unit side, and a second conversion operation of converting a voltage applied to the fourth power path and applying an output voltage to the third power path;

a control unit configured to control the voltage conversion unit; and a first circuit element part capable of allowing a current to flow from the first power path to the third power path and interrupting a current flow from the third power path to the first power path, wherein the power storage unit includes a first power storage unit, and a second power storage unit located on a lower potential side than the first power storage unit and connected in series with the first power storage unit, and the in-vehicle control device further comprises a second circuit element part capable of allowing a current to flow from an intermediate conductive path between the first power storage unit and the second power storage unit to the second power path, and interrupting a current flow from the second power path to the intermediate conductive path.

2. The in-vehicle control device according to claim 1, further including, a third circuit element part provided between the fourth power path and a fifth power path to which an output voltage of the power storage unit is applied; and a fourth circuit element part provided in parallel with an arrangement in which the third circuit element part and the first power storage unit are connected in series, wherein the third circuit element part is configured to interrupt a current flow from the fifth power path to the fourth power path through the third circuit element part when the third circuit element part is off, and to allow a current to flow from the fifth power path to the fourth power path through the third circuit element part when the third circuit element part is on, the fourth circuit element part is configured to interrupt a current flow from the fourth power path to the intermediate conductive path through the fourth circuit element part when the fourth circuit element part is off, and to allow a current to flow from the fourth power path to the intermediate conductive path through the fourth circuit element part when the fourth circuit element part is on, when the control unit causes the voltage conversion unit to perform the first conversion operation by turning the third circuit element part on and the fourth circuit element part off, power is supplied from the voltage conversion unit to the power storage unit, and when the control unit causes the voltage conversion unit to perform the first conversion operation by turning the third circuit element part off and the fourth circuit element part on, power is supplied from the voltage conversion unit to the second power storage unit via the fourth circuit element part.

3. The in-vehicle control device according to claim 2, wherein the control unit causes the voltage conversion unit to perform the first conversion operation by turning the third circuit element part off and the fourth circuit element part on, while allowing a current to flow across the first circuit element part from the first power path to the third power path and allowing a current to flow across the second circuit element part from the intermediate conductive path to the second power path.

4. The in-vehicle control device according to claim 3, wherein the control unit increases power to be supplied from the voltage conversion unit to the intermediate conductive path via the fourth circuit element part to a value that is greater than power to be supplied from the intermediate conductive path to the second power path via the second circuit element part.

5. The in-vehicle control device according to claim 4, wherein, when a voltage of the power storage unit is less than a predetermined lower limit voltage, the control unit causes the voltage conversion unit to start the first conversion operation so that a voltage to be applied to the fourth power path reaches a first target value, while turning the third circuit element part on and the fourth circuit element part off, and when the voltage of the power storage unit is a charge completion voltage, which is higher than or equal to the lower limit voltage, the control unit causes the voltage conversion unit to perform the first conversion operation so that the voltage to be applied to the fourth power path reaches a second target value, which is lower than the first target value, while turning the third circuit element part off and the fourth circuit element part on.

6. The in-vehicle control device according to claim 4, further including;

a fifth circuit element part capable of allowing a current to flow from the third power path to the second power path and interrupting a current flow from the second power path to the third power path.

7. The in-vehicle control device according to claim 3, wherein, when a voltage of the power storage unit is less than a predetermined lower limit voltage, the control unit causes the voltage conversion unit to start the first conversion operation so that a voltage to be applied to the fourth power path reaches a first target value, while turning the third circuit element part on and the fourth circuit element part off, and when the voltage of the power storage unit is a charge completion voltage, which is higher than or equal to the lower limit voltage, the control unit causes the voltage conversion unit to perform the first conversion operation so that the voltage to be applied to the fourth power path reaches a second target value, which is lower than the first target value, while turning the third circuit element part off and the fourth circuit element part on.

8. The in-vehicle control device according to claim 3, further including;

a fifth circuit element part capable of allowing a current to flow from the third power path to the second power path and interrupting a current flow from the second power path to the third power path.

9. The in-vehicle control device according to claim 2, wherein, when a voltage of the power storage unit is less than a predetermined lower limit voltage, the control unit causes the voltage conversion unit to start the first conversion operation so that a voltage to be applied to the fourth power path reaches a first target value, while turning the third circuit element part on and the fourth circuit element part off, and when the voltage of the power storage unit is a charge completion voltage, which is higher than or equal to the lower limit voltage, the control unit causes the voltage conversion unit to perform the first conversion operation so that the voltage to be applied to the fourth power path reaches a second target value, which is lower than the first target value, while turning the third circuit element part off and the fourth circuit element part on.

10. The in-vehicle control device according to claim 9, wherein, if a predetermined failure determination condition is not satisfied when a voltage of the first power path is less than or equal to a first threshold, the control unit causes the voltage conversion unit to perform the first conversion operation by turning the third circuit element part off and the fourth circuit element part on, while allowing a current to flow across the first circuit element part from the first power path to the third power path and allowing a current to flow across the second circuit element part from the intermediate conductive path to the second power path, and if the failure determination condition is satisfied when the voltage of the first power path is less than or equal to the first threshold, the control unit causes the voltage conversion unit to perform the second conversion operation by turning the third circuit element part on and the fourth circuit element part off, while interrupting a current flow across the first circuit element part from the third power path to the first power path and interrupting a current flow across the second circuit element part from the second power path to the intermediate conductive path.

11. The in-vehicle control device according to claim 10, wherein the second circuit element part is configured to interrupt a current flow between the intermediate conductive path and the second power path in both directions through the second circuit element part when the second circuit element part is off, and allow a current to flow from the intermediate conductive path to the second power path through the second circuit element part when the second circuit element part is on, the control unit controls on/off of at least the second circuit element part, and if switching is made from a state where the failure determination condition is not satisfied to a state where the failure determination condition is satisfied when the voltage of the first power path is less than or equal to the first threshold, the control unit keeps the second circuit element part on before and after the switching, the control unit causes, after the switching, the voltage conversion unit to perform the second conversion operation by turning the third circuit element part on and the fourth circuit element part off, while interrupting a current flow across the first circuit element part from the third power path to the first power path, and if the voltage conversion unit satisfies a predetermined operation condition after the switching, the control unit switches the second circuit element part off.

12. The in-vehicle control device according to claim 10, wherein the failure determination condition includes a condition that a current flows from the third power path to the first power path via the first circuit element part, if no current flows from the third power path to the first power path via the first circuit element part when the voltage of the first power path is less than or equal to the first threshold, the control unit causes the voltage conversion unit to perform the first conversion operation by turning the third circuit element part off and the fourth circuit element part on, while allowing a current to flow across the first circuit element part from the first power path to the third power path, and the control unit allows a current to flow across the second circuit element part from the intermediate conductive path to the second power path, and if a current flows from the third power path to the first power path via the first circuit element part when the voltage of the first power path is less than or equal to the first threshold, the control unit causes the voltage conversion unit to perform the second conversion operation by turning the third circuit element part on and the fourth circuit element part off, while interrupting a current flow across the first circuit element part from the third power path to the first power path.

13. The in-vehicle control device according to claim 10, wherein the failure determination condition includes a condition that the voltage of the first power path is less than or equal to a second threshold, which is lower than the first threshold, if the voltage of the first power path is less than or equal to the first threshold and exceeds the second threshold, the control unit causes the voltage conversion unit to perform the first conversion operation by turning the third circuit element part off and the fourth circuit element part on, while allowing a current to flow across the first circuit element part from the first power path to the third circuit element part, and the control unit allows a current to flow across the second circuit element part from the intermediate conductive path to the second power path, and if the voltage of the first power path is less than or equal to the second threshold, the control unit causes the voltage conversion unit to perform the second conversion operation by turning the third circuit element part on and the fourth circuit element part off, while interrupting a current flow across the first circuit element part from the third power path to the first power path.

14. The in-vehicle control device according to claim 10, wherein the failure determination condition includes a condition that a predetermined failure signal is given to the in-vehicle control device from an external device other than the in-vehicle control device, if the voltage of the first power path is less than or equal to the first threshold and the failure signal is not given from the external device, the control unit causes the voltage conversion unit to perform the first conversion operation by turning the third circuit element part off and the fourth circuit element part on, while allowing a current to flow across the first circuit element part from the first power path to the third power path, and the control unit allows a current to flow across the second circuit element part from the intermediate conductive path to the second power path, and if the voltage of the first power path is less than or equal to the first threshold and the failure signal is given from the external device, the control unit causes the voltage conversion unit to perform the second conversion operation by turning the third circuit element part on and the fourth circuit element part off, while interrupting a current flow across the first circuit element part from the third power path to the first power path.

15. The in-vehicle control device according to claim 2, further including;

a fifth circuit element part capable of allowing a current to flow from the third power path to the second power path and interrupting a current flow from the second power path to the third power path.

16. The in-vehicle control device according to claim 1, further including, a fifth circuit element part capable of allowing a current to flow from the third power path to the second power path and interrupting a current flow from the second power path to the third power path.

* * * * *